(12) United States Patent
Lo et al.

(10) Patent No.: US 9,372,543 B2
(45) Date of Patent: Jun. 21, 2016

(54) PRESENTATION INTERFACE IN A VIRTUAL COLLABORATION SESSION

(71) Applicant: Dell Products, L.P., Round Rock, TX (US)

(72) Inventors: Yuan-Chang Lo, Austin, TX (US); Michael S. Gatson, Austin, TX (US); Todd Swierk, Austin, TX (US); Clifton J. Barker, Austin, TX (US); Jason A. Shepherd, Austin, TX (US)

(73) Assignee: DELL PRODUCTS, L.P., Round Rock, TX (US)

(*) Notice: Subject to any disclaimer, the term of this patent is extended or adjusted under 35 U.S.C. 154(b) by 212 days.

(21) Appl. No.: 14/107,766

(22) Filed: Dec. 16, 2013

(65) Prior Publication Data

US 2015/0169069 A1 Jun. 18, 2015

(51) Int. Cl.
*G06F 3/048* (2013.01)
*G06F 3/01* (2006.01)
*G06F 3/00* (2006.01)
*G06F 3/0484* (2013.01)
*H04L 29/06* (2006.01)
*H04L 29/08* (2006.01)
*G06F 3/0481* (2013.01)
*G06Q 10/10* (2012.01)

(52) U.S. Cl.
CPC ............... *G06F 3/017* (2013.01); *G06F 3/005* (2013.01); *G06F 3/011* (2013.01); *G06F 3/0481* (2013.01); *G06F 3/0484* (2013.01); *G06Q 10/101* (2013.01); *H04L 65/403* (2013.01); *H04L 67/22* (2013.01)

(58) Field of Classification Search
CPC ....... G06F 3/005; G06F 3/0481; G06F 3/0483; G06F 3/0488
See application file for complete search history.

(56) References Cited

U.S. PATENT DOCUMENTS

| | | | |
|---|---|---|---|
| 2008/0281851 A1* | 11/2008 | Izadi et al. | 707/102 |
| 2009/0265671 A1* | 10/2009 | Sachs et al. | 715/863 |
| 2011/0270933 A1* | 11/2011 | Jones et al. | 709/206 |
| 2012/0013704 A1* | 1/2012 | Sawayanagi et al. | 348/14.03 |
| 2012/0182384 A1* | 7/2012 | Anderson et al. | 348/14.09 |
| 2012/0227077 A1* | 9/2012 | Spivack et al. | 725/110 |
| 2012/0268376 A1* | 10/2012 | Bi | 345/168 |
| 2012/0278381 A1* | 11/2012 | Ferlitsch et al. | 709/203 |
| 2013/0222246 A1* | 8/2013 | Booms et al. | 345/168 |
| 2013/0335405 A1* | 12/2013 | Scavezze et al. | 345/419 |
| 2014/0101604 A1* | 4/2014 | Han et al. | 715/798 |
| 2015/0009278 A1* | 1/2015 | Modai et al. | 348/14.08 |
| 2015/0134737 A1* | 5/2015 | Albrecht | 709/204 |

* cited by examiner

Primary Examiner — William Bashore
Assistant Examiner — Rayeez Chowdhury
(74) Attorney, Agent, or Firm — Fogarty, L.L.C.

(57) ABSTRACT

Systems and methods for a presentation interface in a virtual collaboration session. In some embodiments, a method may include receiving, from a gesture capture system, an indication of a body movement performed by a participant of a virtual collaboration session; receiving, from a drawing control system, an indication of a drawing characteristic associated with the participant of the virtual collaboration session, and identifying an intent of the participant based upon a combination of the indications.

20 Claims, 6 Drawing Sheets

PRESENTATION INTERFACE IN A VIRTUAL COLLABORATION SESSION

FIELD

This disclosure relates generally to computer systems, and more specifically, to systems and methods for a presentation interface in a virtual collaboration session.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some situations, two or more IHSs may be operated by different users or team members participating in a "virtual collaboration session" or "virtual meeting." Generally speaking, "virtual collaboration" is a manner of collaboration between users that is carried out via technology-mediated communication. Although virtual collaboration may follow similar processes as conventional collaboration, the parties involved in a virtual collaboration session communicate with each other, at least in part, through technological channels.

In the case of an IHS- or computer-mediated collaboration, a virtual collaboration session may include, for example, audio conferencing, video conferencing, a chat room, a discussion board, text messaging, instant messaging, shared database(s), whiteboarding, wikis, application specific groupware, or the like. For instance, "whiteboarding" is the placement of shared images, documents, or other files on a shared on-screen notebook or whiteboard. Videoconferencing and data conferencing functionality may let users annotate these shared documents, as if on a physical whiteboard. With such an application, several people may be able to work together remotely on the same materials during a virtual collaboration session.

SUMMARY

Embodiments of systems and methods for a presentation interface in a virtual collaboration session are described herein. In an illustrative, non-limiting embodiment, a method may include receiving, from a gesture capture system, an indication of a body movement performed by a participant of a virtual collaboration session; receiving, from a drawing control system, an indication of a drawing characteristic associated with the participant of the virtual collaboration session; and identifying an intent of the participant based upon a combination of the indications. For example, such a method may be performed by an Information Handling System (IHS) including a projector, and the virtual collaboration session may include a whiteboarding or desktop sharing application.

In some implementations, the gesture capture system may include a camera, a three-dimensional camera, or an infrared sensor; and the body movement may include face orientation, gaze detection, or wrist articulation. Also, the drawing control system may include an interactive whiteboard, a light curtain, a touch screen, or an infrared sensor; and the drawing characteristic may include a size of a pointer, a distance between a pointer and a board, a pointer speed, or a repetitive motion. Moreover, the intent may include intent to draw, intent to erase, or intent to point.

In some cases, the indication of the body movement may include a numerical quantification of the body movement, the indication of the drawing characteristic may include a numerical quantification of the drawing characteristic, and identifying the intent may include calculating a weighted average between the first and second numerical quantifications.

Additionally or alternatively, the indication of the body movement may include two or more attributes selected from the group consisting of: face orientation, gaze detection, and wrist articulation; the indication of the drawing characteristic may include two or more attributes selected from the group consisting of: a size of a pointer, a distance between a pointer and a board, a pointer speed, and a repetitive motion; and identifying the intent may include combining the attributes.

Additionally or alternatively, the indication of the body movement may indicate at least one of: the participant is facing a whiteboard, the participant is looking at their hand, or the participant's wrist is flexible; the indication of the drawing characteristic may indicate at least one of: a pointer has a dimension smaller than a predetermined value, a distance between the pointer and a whiteboard is zero, a speed of the pointer is between two threshold values, or a same motion is being performed fewer than a predetermined number of times per unit time; and the intent may be identified as intent to draw.

Additionally or alternatively, the indication of the body movement may indicate at least one of: the participant is facing a whiteboard, the participant is looking at their hand, or the participant's wrist is rigid; the indication of the drawing characteristic may indicate at least one of: a pointer has a dimension greater than a predetermined value, a distance between the pointer and a whiteboard is zero, a speed of the pointer is greater than a threshold value, or a same motion is being performed more than a predetermined number of times per unit time, and the intent may be identified as intent to erase.

Additionally or alternatively, the indication of the body movement may indicate at least one of: the participant is facing an audience or camera, the participant is looking at the audience or camera, or the participant's wrist is rigid; the indication of the drawing characteristic may indicate at least one of: a pointer has a dimension smaller than a predetermined value, a distance between the pointer and a whiteboard is smaller than another predetermined value, a speed of the pointer is smaller than a threshold value, or a same motion is being performed fewer than a predetermined number of times per unit time, and the intent may be identified as intent to point.

The method may also include presenting at least two possible intentions to the participant, and allowing the participant to select one of the at least two possible intentions. The method may further include storing the combination of the indications as corresponding to the selected one of the at least two possible intentions.

In another illustrative, non-limiting embodiment, a method may include receiving, from a gesture capture system, an indication of body movement performed by a participant of a virtual collaboration session, wherein the participant operates a computing device that includes the gesture capturing system; identifying an intent of the participant based upon the indication; and fulfilling the intent of the participant during the virtual collaboration session. For example, the gesture capture system may include a camera and the virtual collaboration session includes a whiteboarding or desktop sharing application.

The participant may be located remotely with respect to at least one other participant of the virtual collaboration session, the body movement may include the participant's hand raised above their head, wherein the intent is identified as the need to speak, and wherein to fulfill the intent, the method further comprises notifying the at least one other participant of the participant's need to speak.

In some cases, the body movement may include the participant's finger pointing to an area of a screen of the computing device, the intent may be identified as pointing, and wherein to fulfill the intent, the method further comprises highlighting an area of a whiteboard corresponding to the area of the screen. Additionally or alternatively, the body movement may indicate the participant's approval or disapproval, the intent may be identified as voting, and to fulfill the intent, the method further comprises capturing an indication of the participant's vote.

In yet another illustrative, non-limiting embodiment, yet another method may include receiving, from a gesture capture system, an indication of body movement performed by a presenter of a whiteboarding session, where the body movement includes a face orientation, a gaze, and a wrist articulation; receiving, from a drawing control system, an indication of drawing feature associated with the presenter of the whiteboarding session, where the drawing feature includes at least one of: a size of a pointer, a distance between a pointer and a board, a pointer speed, or a repetitive motion; and identifying an intent of the participant based upon a combination of the indications, where the intent includes: an intent to draw, an intent to erase, or an intent to point.

In some embodiments, one or more of the techniques described herein may be performed, at least in part, by an IHS operated by a given one of a plurality of participants of a virtual collaboration session. In other embodiments, these techniques may be performed by an IHS having a processor and a memory coupled to the processor, the memory including program instructions stored thereon that, upon execution by the processor, cause the IHS to execute one or more operations. In yet other embodiments, a non-transitory computer-readable medium may have program instructions stored thereon that, upon execution by an IHS, cause the IHS to execute one or more of the techniques described herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
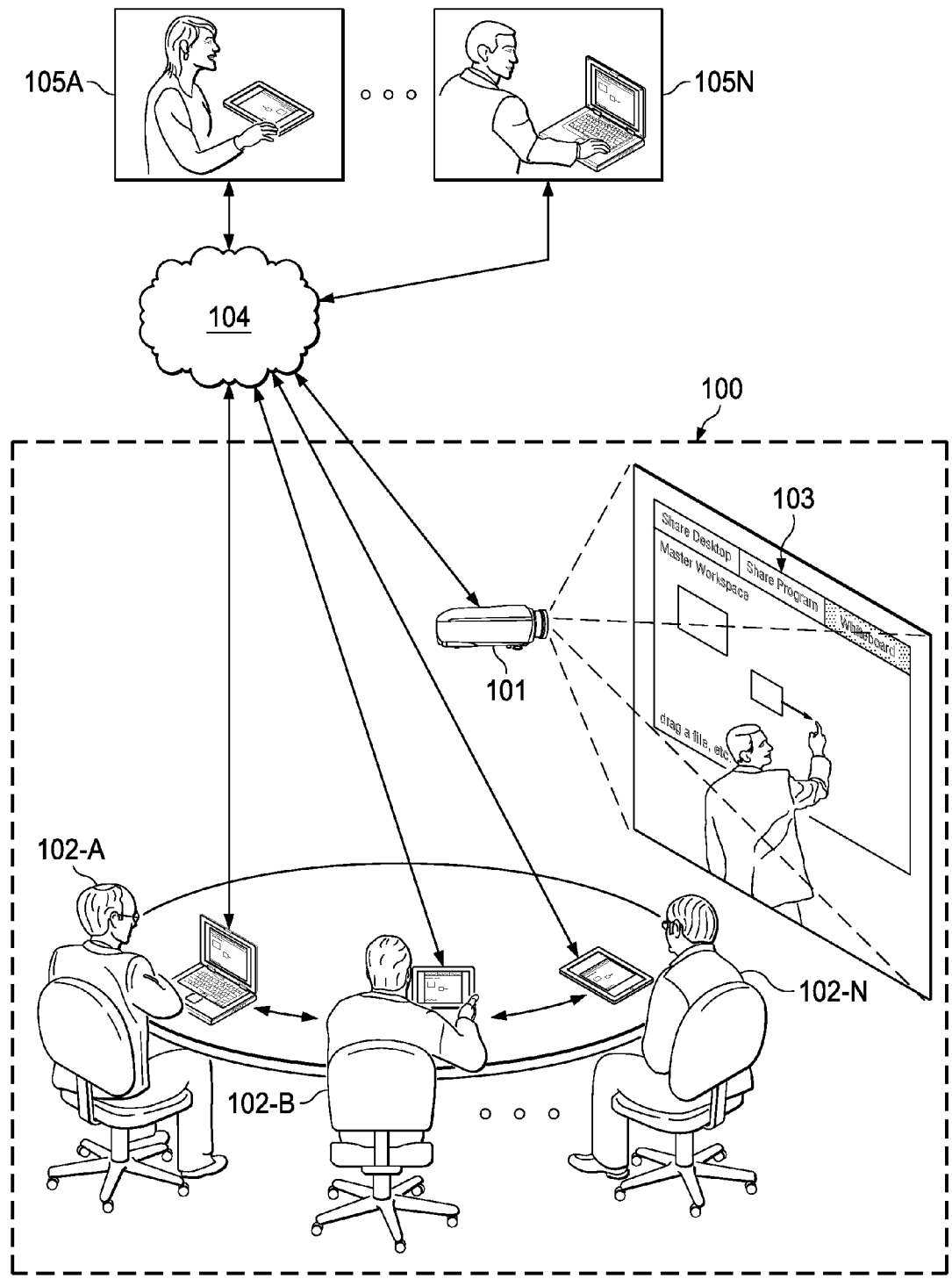
FIG. 1 is a diagram illustrating an example of an environment where systems and methods for a presentation interface in a virtual collaboration session may be implemented according to some embodiments.

To facilitate explanation of the various systems and methods discussed herein, the following description has been split into sections. It should be noted, however, that the various sections, headings, and subheadings used herein are for organizational purposes only, and are not meant to limit or otherwise modify the scope of the description or the claims.

Overview

The inventors hereof have recognized a need for new tools that enable better team interactions and improve effectiveness in the workplace, particularly as the workforce becomes more geographically-distributed and as the volume of business information created and exchanged increases to unprecedented levels. Existing tools intended to facilitate collaboration include digital whiteboarding, instant messaging, file sharing, and unified communication platforms. Unfortunately, such conventional tools are fragmented and do not adequately address certain problems specific to real-time interactions. In addition, these tools do not capitalize on contextual information for further gains in productivity and ease of use.

Examples of problems faced by distributed teams include the lack of a universally acceptable manner of performing whiteboarding sessions. The use of traditional dry erase boards in meeting rooms excludes or limits the ability of remote workers to contribute and current digital whiteboarding options are unnatural to use and are therefore not being adopted. In addition, there are numerous inefficiencies in setting up meeting resources, sharing in real-time, and distribution of materials after meetings such as emailing notes, presentation materials, and digital pictures of whiteboard sketches. Fragmentation across tool sets and limited format optimization for laptops, tablets, and the use of in-room projectors present a further set of issues. Moreover, the lack of continuity between meetings and desk work and across a meeting series including common file repositories, persistent notes and whiteboard sketches, and historical context can create a number of other problems and inefficiencies.

To address these, and other concerns, the inventors hereof have developed systems and methods that address, among other things, the setting up of resources for a virtual collaboration session, the taking of minutes and capture of whiteboard sketches, the creation and management to agendas, and/or provide the ability to have the right participants and information on hand for a collaboration session.

In some embodiments, these systems and methods focus on leveraging technology to increase effectiveness of real-time team interactions in the form of a "connected productivity framework." A digital or virtual workspace part of such a framework may include an application that enables both in-room and remote users the ability to interact easily with the collaboration tool in real-time. The format of such a virtual workspace may be optimized for personal computers (PCs), tablets, mobile devices, and/or in-room projection. The workspace may be shared across all users' personal devices, and it may provide a centralized location for presenting files and whiteboarding in real-time and from anywhere. The integration of context with unified communication and note-taking functionality provides improved audio, speaker identification, and automation of meeting minutes.

The term "context," as used herein, refers to information that may be used to characterize the situation of an entity. An entity is a person, place, or object that is considered relevant to the interaction between a user and an application, including the user and application themselves. Examples of context include, but are not limited to, location, people and devices nearby, and calendar events.

For instance, a connected productivity framework may provide, among other things, automation of meeting setup, proximity awareness for automatic joining of sessions, Natural User Interface (NUI) control of a workspace to increase the usability and adoption, intelligent information management and advanced indexing and search, and/or meeting continuity. Moreover, a set of client capabilities working in concert across potentially disparate devices may include: access to a common shared workspace with public and private workspaces for file sharing and real-time collaboration, advanced digital whiteboarding with natural input to dynamically control access, robust search functionality to review past work, and/or the ability to seamlessly moderate content flow, authorization, and intelligent information retrieval.

When certain aspects of the connected productivity framework described herein are applied to a projector, for instance, the projector may become a fixed point of reference providing contextual awareness. The projector may maintain a relationship to the room and associated resources (e.g., peripheral hardware). This allows the projector be a central hub for organizing meetings, and it does not necessarily rely on a host user and their device to be present for meeting and collaborating.

In some implementations, a cloud-hosted or enterprise service infrastructure as described herein may allow virtual collaboration session to be persistent. Specifically, once a document, drawing, or other content is used during a whiteboard session, for example, the content may be tagged as belonging to that session. When a subsequent session takes places that is associated with a previous session (and/or when the previous session is resumed at a later time), the content and transactions previously performed in the virtual collaboration environment may be retrieved so that, to participants, there is meeting continuity. In some embodiments, the systems and methods described herein may provide "digital video recorder" (DVR)-type functionality for collaboration sessions, such that participants may be able to record meeting events and play those events back at a later time, or "pause" the in-session content in temporary memory. The latter feature may enable a team to pause a meeting when they exceed the scheduled time and resume the in-session content in another available conference room, for example.

As will be understood by a person of ordinary skill in the art in light of this disclosure, virtually any commercial business setting that requires meeting or collaboration may implement one or more aspects of the systems and methods described herein. Additionally, aspects of the connected productivity framework described herein may be expanded to other areas, such as educational verticals for use in classrooms, or to consumers for general meet-ups.

Virtual Collaboration Architecture

Turning now to FIG. 1, a diagram illustrating an example of an environment where systems and methods for a presentation interface in a virtual collaboration session may be implemented is depicted according to some embodiments. As shown, interactive collaboration tool 101 operates as a central meeting host and/or shared digital whiteboard for conference room 100 in order to enable a virtual collaboration session. In some embodiments, interactive collaboration tool may include (or otherwise be coupled to) a real-time communications server, a web server, an object store server, and/or a database. Moreover, interactive collaboration tool 101 may be configured with built-in intelligence and contextual awareness to simplify meeting setup and provide continuity between meetings and desk work.

In some implementations, for example, interactive collaboration tool 101 may include a video projector or any other suitable digital and/or image projector that receives a video signal (e.g., from a computer, a network device, or the like) and projects corresponding image(s) 103 on a projection screen using a lens system or the like. In this example, image 103 corresponds to a whiteboarding application, but it should be noted that any collaboration application may be hosted and/or rendered using tool 101 during a virtual collaboration session.

Any number of in-room participants 102A-N and any number of remote participants 105A-N may each operate a respective IHS or computing device including, for example, desktops, laptops, tablets, or smartphones. In a typical situation, in-room participants 102A-N are in close physical proximity to interactive collaboration tool 101, whereas remote participants 105A-N are located in geographically distributed or remote locations, such as other offices or their homes. In other situations, however, a given collaboration session may include only in-room participants 102A-N or only remote participants 105A-N.

With regard to participants 102A-N and 105A-N, it should be noted that users participating in a virtual collaboration session or the like may have different classifications. For example, a participant may include a member of the session. A moderator may be an owner of the meeting workspace and leader that moderates the participants of the meeting. Often the moderator has full control of the session, including material content, what is displayed on the master workspace, and the invited list of participants. Moreover, an editor may include a meeting participant or the moderator who has write privileges to update content in the meeting workspace.

Interactive collaboration tool 101 and participants 102A-N and 105A-N may include any end-point device capable of audio or video capture, and that has access to network 104. In various embodiments, telecommunications network 104 may include one or more wireless networks, circuit-switched networks, packet-switched networks, or any combination thereof to enable communications between two or more of IHSs. For example, network 104 may include a Public Switched Telephone Network (PSTN), one or more cellular networks (e.g., third generation (3G), fourth generation (4G), or Long Term Evolution (LTE) wireless networks), satellite networks, computer or data networks (e.g., wireless networks, Wide Area Networks (WANs), metropolitan area networks (MANs), Local Area Networks (LANs), Virtual Private Networks (VPN), the Internet, etc.), or the like.

Figure 2:
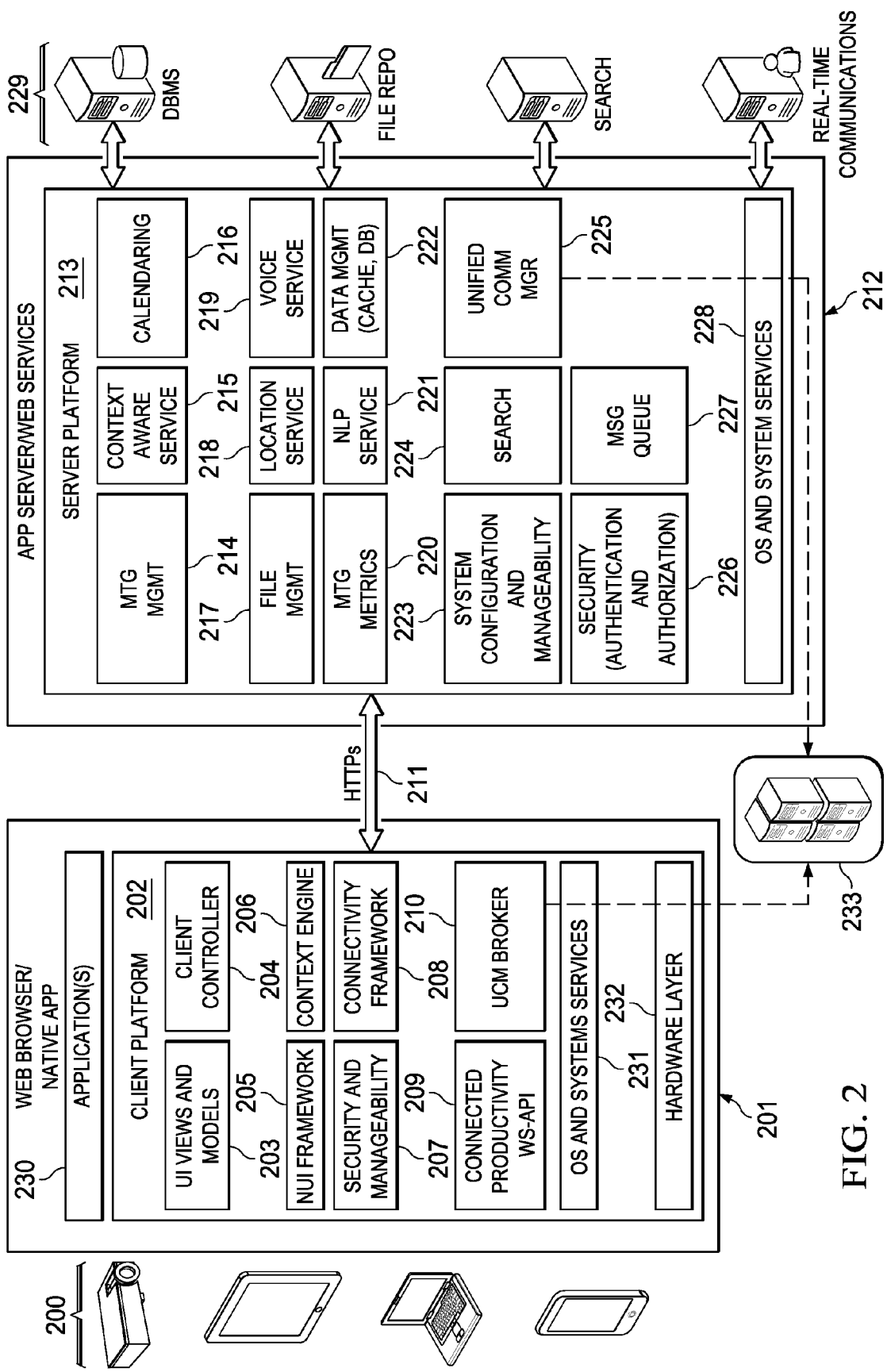
FIG. 2 is a block diagram of a cloud-hosted or enterprise service infrastructure for a presentation interface in a virtual collaboration session according to some embodiments.

FIG. 2 is a block diagram of a cloud-hosted or enterprise service infrastructure. In some embodiments, the infrastructure of FIG. 2 may be implemented in the context of environment of FIG. 1 to provide a presentation interface in a virtual collaboration session. Particularly, one or more participant devices 200 (operated by in-room participants 102A-N and/or remote participants 105A-N) may be each configured to execute client platform 202 in the form of a web browser or native application 201. As such, on the client side, one or more virtual collaboration application(s) 230 (e.g., a whiteboarding application or the like) may utilize one or more of modules 203-210, 231, and/or 232 to perform one or more virtual collaboration operations. Application server or web services 212 may contain server platform 213, and may be executed, for example, by interactive collaboration tool 101.

As illustrated, web browser or native application 201 may be configured to communicate with application server or web services 212 (and vice versa) via link 211 using any suitable protocol such as, for example, Hypertext Transfer Protocol (HTTP) or HTTP Secure (HTTPS). Each module within client platform 202 and application server or web services 212 may be responsible to perform a specific operation or set of operations within the collaborative framework.

Particularly, client platform 202 may include user interface (UI) view & models module 203 configured to provide a lightweight, flexible user interface that is portable across platforms and device types (e.g., web browsers in personal computers, tablets, and phones using HyperText Markup Language (HTML) 5, Cascading Style Sheets (CSS) 3, and/or JavaScript). Client controller module 204 may be configured to route incoming and outgoing messages accordingly based on network requests or responses. Natural User Interface (NUI) framework module 205 may be configured to operate various hardware sensors for touch, multi-point touch, visual and audio provide the ability for voice commands and gesturing (e.g., touch and 3D based). Context engine module 206 may be configured to accept numerous inputs such as hardware sensor feeds and text derived from speech. In some instances, context engine module 206 may be configured to perform operations such as, for example, automatic participant identification, automated meeting joining and collaboration via most effective manner, location aware operations (e.g., geofencing, proximity detection, or the like) and associated management file detection/delivery, etc.

Client platform 202 also includes security and manageability module 207 configured to perform authentication and authorization operations, and connectivity framework module 208 configured to detect and connect with other devices (e.g., peer-to-peer). Connected productivity module 209 may be configured to provide a web service API (WS-API) that allows clients and host to communicate and/or invoke various actions or data querying commands. Unified Communication (UCM) module 210 may be configured to broker audio and video communication including file transfers across devices and/or through third-party systems 233.

Within client platform 202, hardware layer 232 may include a plurality of gesture tracking (e.g., touchscreen or camera), audio and video capture (e.g., camera, microphone, etc.), and wireless communication devices or controllers (e.g., Bluetooth®, WiFi, Near Field Communications, or the like). Operating system and system services layer 231 may have access to hardware layer 232, upon which modules 203-210 rest. In some cases, third-party plug-ins (not shown) may be communicatively coupled to virtual collaboration application 230 and/or modules 203-210 via an Application Programming Interface (API).

Server platform 213 includes meeting management module 214 configured to handle operations such as, for example, creating and managing meetings, linking virtual workspace, notifying participants of invitations, and/or providing configuration for auto calling (push/pull) participants upon start of a meeting, among others. Context aware service 215 may be configured to provide services used by context engine 206 of client platform 202. Calendaring module 216 may be configured to unify participant and resource scheduling and to provide smart scheduling for automated search for available meeting times.

Moreover, server platform 213 also includes file management module 217 configured to provide file storage, transfer, search and versioning. Location service module 218 may be configured to perform location tracking, both coarse and fine grained, that relies on WiFi geo-location, Global Positioning System (GPS), and/or other location technologies. Voice service module 219 may be configured to perform automated speech recognition, speech-to-text, text-to-speech conversation and audio archival. Meeting metrics module 220 may be configured to track various meeting metrics such as talk time, topic duration and to provide analytics for management and/or participants.

Still referring to server platform 213, Natural Language Processing (NLP) service module 221 may be configured to perform automatic meeting summation (minutes), conference resolution, natural language understanding, named entity recognition, parsing, and disambiguation of language. Data management module 222 may be configured to provide distributed cache and data storage of application state and session in one or more databases. System configuration & manageability module 223 may provide the ability to configure one or more other modules within server platform 213. Search module 224 may be configured to enable data search operations, and UCM manager module 225 may be configured to enable operations performed by UCM broker 210 in conjunction with third-party systems 233.

Security (authentication & authorization) module 226 may be configured to perform one or more security or authentication operations, and message queue module 227 may be configured to temporarily store one or more incoming and/or outgoing messages. Within server platform 213, operating system and system services layer 228 may allow one or more modules 214-227 to be executed.

In some embodiments, server platform 213 may be configured to interact with a number of other servers 229 including, but not limited to, database management systems (DBMSs), file repositories, search engines, and real-time communication systems. Moreover, UCM broker 210 and UCM manager 225 may be configured to integrate and enhance third-party systems and services (e.g., Outlook®, Gmail®, Dropbox®, Box.net®, Google Cloud®, Amazon Web Services®, Salesforce®, Lync®, WebEx®, Live Meeting®) using a suitable protocol such as HTTP or Session Initiation Protocol (SIP).

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 3:
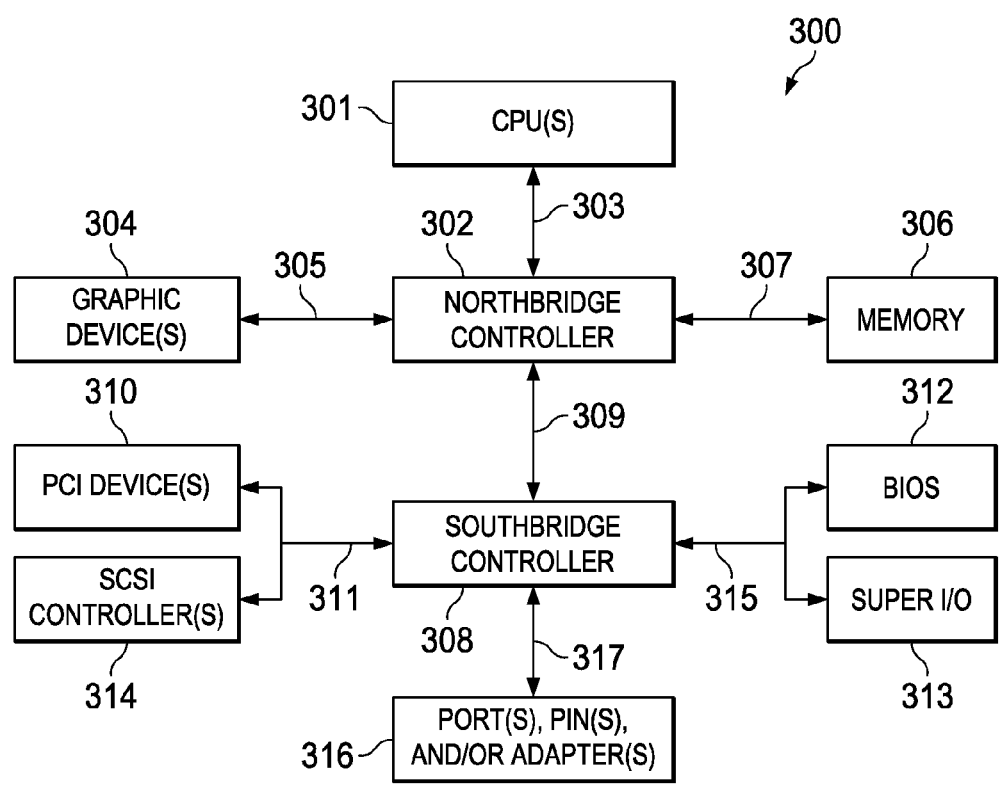
FIG. 3 is a block diagram of an example of an Information Handling System (IHS) according to some embodiments.

FIG. 3 is a block diagram of an example of an IHS. In some embodiments, IHS 300 may be used to implement any of computer systems or devices 101, 102A-N, and/or 105A-N. As shown, IHS 300 includes one or more CPUs 301. In various embodiments, IHS 300 may be a single-processor system including one CPU 301, or a multi-processor system including two or more CPUs 301 (e.g., two, four, eight, or any other suitable number). CPU(s) 301 may include any processor capable of executing program instructions. For example, in various embodiments, CPU(s) 301 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 301 may commonly, but not necessarily, implement the same ISA.

CPU(s) 301 are coupled to northbridge controller or chipset 301 via front-side bus 303. Northbridge controller 302 may be configured to coordinate I/O traffic between CPU(s) 301 and other components. For example, in this particular implementation, northbridge controller 302 is coupled to graphics device(s) 304 (e.g., one or more video cards or adaptors) via graphics bus 305 (e.g., an Accelerated Graphics Port or AGP bus, a Peripheral Component Interconnect or PCI bus, or the like). Northbridge controller 302 is also coupled to system memory 306 via memory bus 307. Memory 306 may be configured to store program instructions and/or data accessible by CPU(s) 301. In various embodiments, memory 306 may be implemented using any suitable memory technology, such as static RAM (SRAM), synchronous dynamic RAM (SDRAM), nonvolatile/Flash-type memory, or any other type of memory.

Northbridge controller 302 is coupled to southbridge controller or chipset 308 via internal bus 309. Generally speaking, southbridge controller 308 may be configured to handle various of IHS 300's I/O operations, and it may provide interfaces such as, for instance, Universal Serial Bus (USB), audio, serial, parallel, Ethernet, or the like via port(s), pin(s), and/or adapter(s) 316 over bus 317. For example, southbridge controller 308 may be configured to allow data to be exchanged between IHS 300 and other devices, such as other IHSs attached to a network (e.g., network 104). In various embodiments, southbridge controller 308 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 308 may also enable connection to one or more keyboards, keypads, touch screens, scanning devices, voice or optical recognition devices, or any other devices suitable for entering or retrieving data. Multiple I/O devices may be present in IHS 300. In some embodiments, I/O devices may be separate from IHS 300 and may interact with IHS 300 through a wired or wireless connection. As shown, southbridge controller 308 is further coupled to one or more PCI devices 310 (e.g., modems, network cards, sound cards, or video cards) and to one or more SCSI controllers 314 via parallel bus 311. Southbridge controller 308 is also coupled to Basic I/O System (BIOS) 312 and to Super I/O Controller 313 via Low Pin Count (LPC) bus 315.

BIOS 312 includes non-volatile memory having program instructions stored thereon. Those instructions may be usable CPU(s) 301 to initialize and test other hardware components and/or to load an Operating System (OS) onto IHS 300. Super I/O Controller 313 combines interfaces for a variety of lower bandwidth or low data rate devices. Those devices may include, for example, floppy disks, parallel ports, keyboard and mouse, temperature sensor and fan speed monitoring/control, among others.

In some cases, IHS 300 may be configured to provide access to different types of computer-accessible media separate from memory 306. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 300 via northbridge controller 302 and/or southbridge controller 308.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 302 may be combined with southbridge controller 308, and/or be at least partially incorporated into CPU(s) 301. In other implementations, one or more of the devices or components shown in FIG. 3 may be absent, or one or more other components may be added. Accordingly, systems and methods described herein may be implemented or executed with other IHS configurations.

Virtual Collaboration Application

In various embodiments, the virtual collaboration architecture described above may be used to implement a number of systems and methods in the form of virtual collaboration application 230 shown in FIG. 2. These systems and methods may be related to meeting management, shared workspace (e.g., folder sharing control, remote desktop, or application sharing), digital whiteboard (e.g., collaboration arbitration, boundary, or light curtain based input recognition), and/or personal engagement (e.g., attention loss detection, eye tracking, etc.), some of which are summarized below and explained in more detail in subsequent section(s).

For example, virtual collaboration application 230 may implement systems and/or methods for managing public and private information in a collaboration session. Both public and private portions of a virtual collaboration workspace may be incorporated into the same window of a graphical user interface. Meeting/project content in the public and private portions may include documents, email, discussion threads, meeting minutes, whiteboard drawings, lists of participants and their status, and calendar events. Tasks that may be performed using the workspace include, but are not limited to, editing of documents, presentation of slides, whiteboard drawing, and instant messaging with remote participants.

Additionally or alternatively, virtual collaboration application 230 may implement systems and/or methods for real-time moderation of content sharing to enable the dynamic moderating of participation in a shared workspace during a meeting. Combining a contact list alongside the shared workspace and folder system in one simplified and integrated User Interface (UI) puts all input and outputs in one window so users simply drag and drop content, in-session workspace tabs, and people to and from each other to control access rights and share. Behavior rules dictating actions may be based on source and destination for drag and drop of content and user names. Actions may differ depending on whether destination is the real-time workspace or file repository. Also, these systems and methods provide aggregation of real-time workspace (whiteboard/presentation area) with file repository and meeting participant lists in one UI.

Additionally or alternatively, virtual collaboration application 230 may implement systems and/or methods for correlating stroke drawings to audio. Such systems and methods may be configured to correlate participants' audio and drawing input by synchronization of event triggers on a given device(s). As input is received (drawing, speech, or both), the data are correlated via time synchronization, packaged together, and persisted on a backend system, which provides remote synchronous and asynchronous viewing and playback features for connected clients. The data streams result in a series of layered inputs that link together the correlated audio and visual (sketches). This allows participants to revisit previous collaboration settings. Not only can a user playback the session in its entirety, each drawing layer and corresponding audio can be reviewed non-linearly.

Additionally or alternatively, virtual collaboration application 230 may implement systems and/or methods for live speech-to-text broadcast communication. Such systems and methods may be configured to employ Automatic Speech Recognition (ASR) technology combined with a client-server model and in order to synchronize the converted speech's text transcript for real-time viewing and later audio playback within a scrolling marquee (e.g., "news ticker"). In conjunction with the converted speech's text the audio data of the speech itself is persisted on a backend system, it may provide remote synchronous and asynchronous viewing and playback features for connected clients.

Additionally or alternatively, virtual collaboration application 230 may implement systems and/or methods for dynamic whiteboarding drawing area. In some cases, a virtual border may be developed around the center of a user's cursor as soon as that user starts to draw in a shared whiteboard space. The border may simulate the physical space that the user would block in front of a traditional wall-mounted whiteboard and is represented to all session participants as a color-coded shaded area or outline, for example. It provides dynamic virtual border for reserving drawing space with automatic inactivity time out and resolution with other borders, as well as moderation control of a subset of total available area, allowing border owner to invite others to draw in their temporary space, and the ability to save subsets of a digital whiteboard for longer periods of time.

Additionally or alternatively, virtual collaboration application 230 may implement systems and/or methods for coaching users on engagement in meetings and desk work. These systems and methods may be configured to measure a user's activity and to feedback relevant information regarding their current level of engagement. Sensors may detect activity including facial movements, gestures, spoken audio, and/or application use. Resulting data may be analyzed and ranked with priority scores to create statistics such as average speaking time and time spent looking away from screen. As such, these systems and methods may be used to provide contextual feedback in a collaborative setting to monitor and to improve worker effectiveness, ability to set goals for improvement over time, such as increased presence in meetings and reduced time spent on low-priority activities, combined monitoring of device and environmental activity to adapt metrics reported based on user's context, and ability for user to extend to general productivity improvement.

Additionally or alternatively, virtual collaboration application 230 may implement systems and/or methods for automated tracking of meeting behavior and optimization over time. Such systems and methods may act as a planning tool configured to leverage device sensors, user calendars, and/or note-taking applications to track user behavior in meetings and suggest optimizations over time to increase overall effectiveness. As such, these systems and methods may leverage device proximity awareness to automatically track user attendance in scheduled meetings over time and/or use ASR to determine participation levels and mood of meetings (e.g., assess whether attendance is too high, too low, and general logistics).

Additionally or alternatively, virtual collaboration application 230 may implement systems and/or methods for managing meeting or meeting topic time limits in a distributed environment. A meeting host service may provide controlled timing and notification of meeting events through use of contextual information such as speaker identification, key word tracking, and/or detection of meeting participants through proximity. Meeting host and individual participants may be notified of time remaining prior to exceeding time limits. Examples include, but are not limited to, time remaining for (current) topic and exceeding preset time-to-talk limit. In some cases, these systems and methods may be configured to perform aggregation of contextual data with traditional calendar, contact, and agenda information to create unique meeting events such as identifying participants present at start and end of meeting (e.g., through device proximity). Such systems and methods may also be configured to use of contextual data for dynamic management of meeting timing and flow in a distributed environment, and to provide contextual-based feedback mechanism to individuals such as exceeding preset time-to-talk.

Additionally or alternatively, virtual collaboration application 230 may implement systems and/or methods for enhanced trust relations based on peer-to-peer (P2P) direct communications. In many situations people whom have not met in person may be in communication with each other via email, instant messages (IMs), and through social media. With the emerging P2P direct communications, face-to-face communication may be used as an out-of-band peer authentication ("we have met"). By attaching this attribute in a user's contact list, when the user is contacted by other people whose contact information indicates that they have interacted face-to-face, these systems and methods may provide the user a higher level of trust.

Additionally or alternatively, virtual collaboration application 230 may implement systems and/or methods for a gesture enhanced interactive whiteboard. Traditional digital whiteboard uses object size and motion to detect if a user intending to draw on the board or erase a section of the board. This feature can have unintended consequences, such as interpreting pointing as drawing. To address this, and other concerns, these systems and methods may augment the traditional whiteboard drawing/erase detection mechanism, such as light curtain, with gesture recognition system that can track the user's face orientation, gaze and/or wrist articulation to discern user intent.

Additionally or alternatively, virtual collaboration application 230 may implement systems and/or methods for hand raise gesture to indicate needing turn to speak. It has become very commonplace to have remote workers who participate in conference call meetings. One key pain point for remote workers is letting others know that they wish to speak, especially if there are many participants engaged in active discussion in a meeting room with a handful or few remote workers on the conference call. Accordingly, these systems and methods may interpret and raise gesture that is detected by a laptop web cam as automatically indicating to meeting participants that a remote worker needs or wants a turn to speak.

Additionally or alternatively, virtual collaboration application 230 may implement systems and/or methods for providing visual audio quality cues for conference calls. One key pain point anyone who has attended conference calls can attest to is poor audio quality on the conference bridge. More often than not, this poor audio experience is due to background noise introduced by one (or several) of the participants. It is often the case that the specific person causing the bridge noise is at the same time not listening to even know they are causing disruption of the conference. Accordingly, these systems and methods may provide a visual cue of audio quality of speaker (e.g., loudness of speaker, background noise, latency, green/yellow/red of Mean opinion score (MOS)), automated identification of noise makers (e.g., moderator view and private identification to speaker), and/or auto muting/filtering of noise makers (e.g., eating sounds, keyboard typing, dog barking, baby screaming).

Presentation Interface in a Virtual Collaboration Session

Digital whiteboards are becoming popular tools to capture ideas seamlessly into portable devices or to the cloud. Such digital whiteboards are also often used as a presentation and instructional device that the presenter can use to interactively draw and highlight materials. Digital whiteboards may also allow remote attendees to interact with in-room participants on the same whiteboard or shared desktop.

Nevertheless, the inventors hereof have determined that a conventional digital whiteboard system cannot tell when a user wants to draw, erase, or simply point to a region of the digital whiteboard. This can cause unintended marks on the whiteboard, or unintended erasure of material from the whiteboard. In addition, while remote attendees may be able to interact with in-room participants, these interactions can be fairly limiting, hindering their overall experience in contributing to the discussion (for example, if it is an interactive session requiring input from all attendees on the digital whiteboard).

To address these concerns, certain systems and methods described herein employ gesture recognition technology in conjunction with large surface drawing control technology to activate an appropriate digital whiteboard operation (draw, erase, point) according to the participant's intent. In some cases, by combining the two modes of inputs, a participant's intentions may be more accurately interpreted.

In some embodiments, a gesture recognition system may include optical sensing technology and/or object tracking technology, and may be implemented as a camera, a three-dimensional camera or body sensor, an infrared sensor, or the like configured to detect body orientation, head orientation or gaze, and/or hand location/movement. Meanwhile, a surface drawing control system may include object location/motion sensing technology and/or object size/shape sensing technology, and may be implemented as a camera, a light curtain, a touch screen, or an infrared sensor configured to detect contact with the whiteboard and track that point of contact as it moves across the whiteboard. In some cases, the gesture recognition system may be part of interactive collaboration tool 101 (e.g., a projector), whereas the surface drawing control system may be a part of the whiteboard itself.

For instance, when implemented using interactive collaboration tool 101, a 3D body sensor and/or a light curtain may provide a hardware and/or API interface to context aware service module 215 as part of OS and system services 228 of server platform 213. When implemented as part of a participant's communication device 200, a camera and/or a touch screen sensor may provide a hardware and/or API interface to context engine 206 as part of hardware layer 232 and/or OS and system services module 231 of client platform 202.

In the description that follows, examples of participants' intent detectable by the systems and methods described herein include intent to draw (to create new content on the whiteboard through writing or drawing actions and movements), intent to erase (to remove content already existing on the whiteboard), and intent to point (to at least temporarily highlight a region of the whiteboard). It should be noted, however, that these different intents and actions may be extended to implement other intents or actions that are useful for whiteboard interactions, with additional input criteria that are appropriate for the new actions.

Additionally or alternatively, other features may be used to interpret gestures for presentation control (e.g., next slide, previous slide, undo, redo, start blank presentation, projector control such as volume, brightness, etc.). Although the techniques illustrated here are used with a projector in a meeting room, similar techniques may be used to interpret the intent of a remote participant who may be using a laptop or tablet device with a touch screen to interact with a whiteboard or to annotate a presentation.

Figure 4:
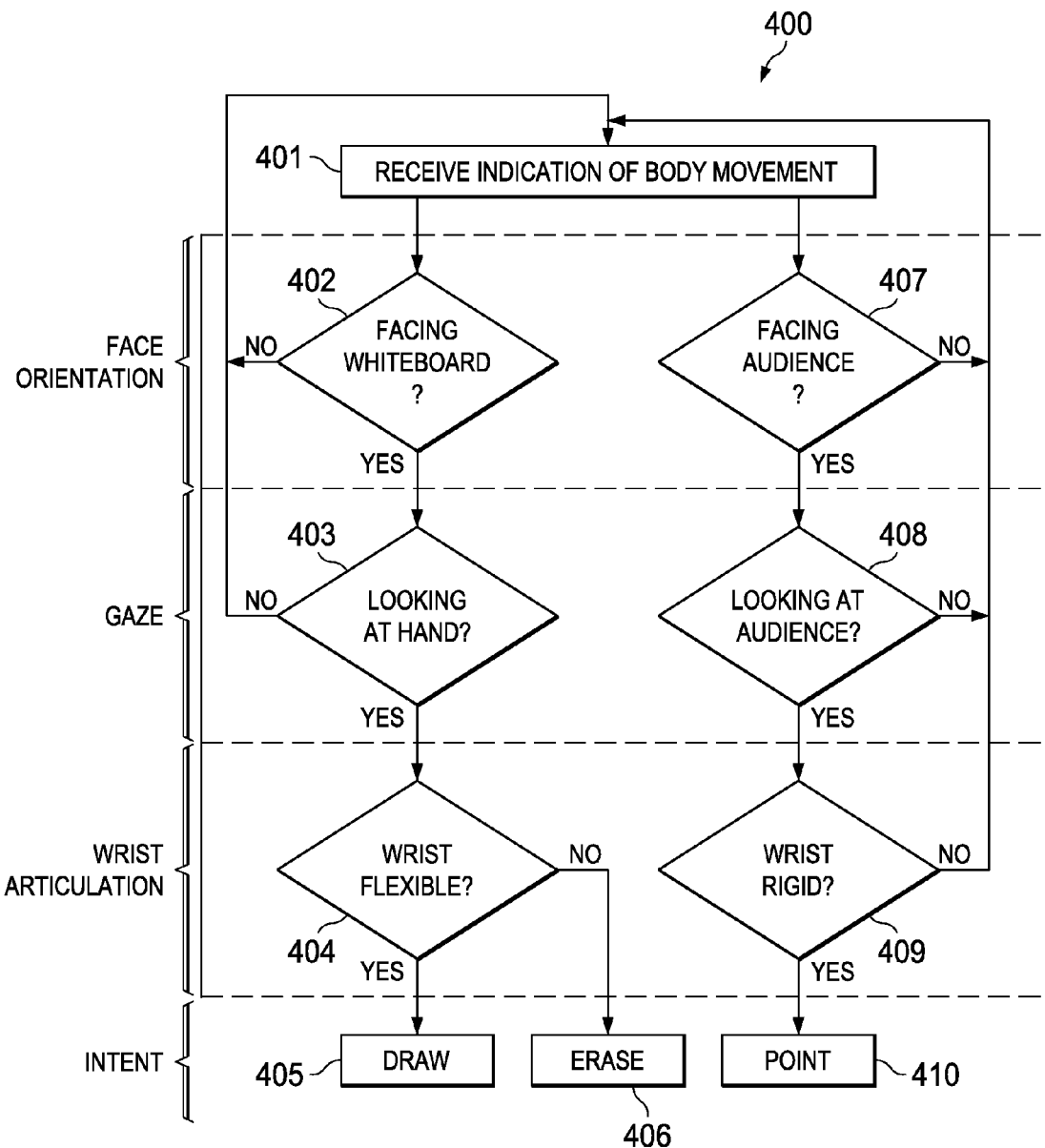
FIG. 4 is a flowchart of a method for performing gesture capture detection according to some embodiments.

FIG. 4 is a flowchart of a method for performing gesture capture detection. In some embodiments, method 400 may be performed, at least in part, by interactive collaboration tool 101 using a gesture capture device such as a camera, 3D camera or body sensor, or infrared sensor. At block 401, method 400 includes receiving an indication of body movement or motion. Examples of body movement include, but are not limited to, face orientation, gaze orientation or direction, and hand or wrist articulation/location/movement. At block 402, method 400 includes determining whether the user is facing the whiteboard. If not, control returns to block 401, otherwise block 403 determines whether the user is looking at their own hand(s). If not, control returns to block 401, otherwise block 404 determines whether the user's wrist is in a relaxed or flexible state. If so, then method 400 identifies the user's intent to draw, otherwise method 400 detects the user's intent to erase.

At block 407, method 400 determines whether the user is facing the audience (e.g., other in-room participant(s), a broadcasting camera, etc.). If not, control returns to block 401, otherwise block 408 determines if the user is looking at the audience. If the user is not looking at the audience, control returns to block 401, otherwise block 409 determines if the user's wrist is rigid. If the user's wrist is not rigid, control returns to block 401, otherwise at block 410 method 400 identifies the user's intent to point. These actions and the resulting detected intent are summarized below:

TABLE I

| | Intended Action Classification | | |
|---|---|---|---|
| Input/Attribute | Draw | Erase | Point |
| Face orientation | Facing whiteboard | Facing whiteboard | Facing audience |
| Gaze | Looking at hand | Looking at hand | Looking at audience |
| Wrist articulation | Flexible | Rigid | Rigid |

Figure 5:
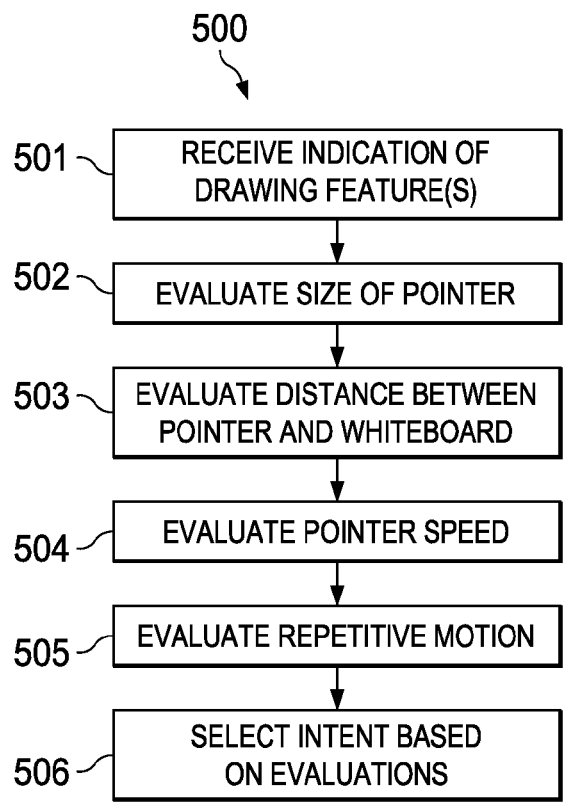
FIG. 5 is a flowchart of a method for performing drawing capture detection according to some embodiments.

FIG. 5 is a flowchart of a method for performing drawing capture detection. In some embodiments, method 500 may be performed, at least in part, by interactive collaboration tool 101 using a drawing capture device such as a camera, light curtain, a touch screen, or an infrared sensor. In other embodiments, method 500 may be performed by a participant device 200.

At block 501, method 500 includes receiving an indication of a drawing feature, characteristic or action. At block 502, method 500 evaluates the size of a pointer (e.g., a finger, pen, retractable wand, etc.) used by the user. At block 503, method 500 evaluates the distance between the edge of the pointer and the whiteboard. At block 504, method 500 evaluates the pointer's speed. At block 505, method evaluates the existence of a repetitive motion. And at block 506, method 500 selects the intent of the user based upon the aforementioned evaluations.

Characteristics that detectable via a drawing control system and the resulting detected intent are summarized below:

TABLE II

| | Intended Action Classification | | |
|---|---|---|---|
| Input/Attribute | Draw | Erase | Point |
| Size of pointer | <1" | >2" | <1" |
| Distance pointer-board | 0" (touching) | 0" | <6" |
| Pointer speed | Slow-moderate | rapid | Stationary-slow |
| Repetitive motion | <2/sec | >2/sec | <2/sec |

In some embodiments, the evaluations of blocks 502-505 may be performed based upon one or more selected threshold values. For example, if the size of the pointer is determined at block 502 to be smaller than a first threshold value (e.g., <1"), the user's intention may be classified as "draw" or "point." Conversely, if the size of the pointer is determined to be greater than a second threshold value (e.g., >2"), the user's intention may be classified as "erase." Similarly, different threshold values may be used to evaluate the distance between the pointer and the whiteboard, the pointer speed, and the number of times a certain motion must be repetitive before it is considered to be a "repetitive motion."

Figure 6:
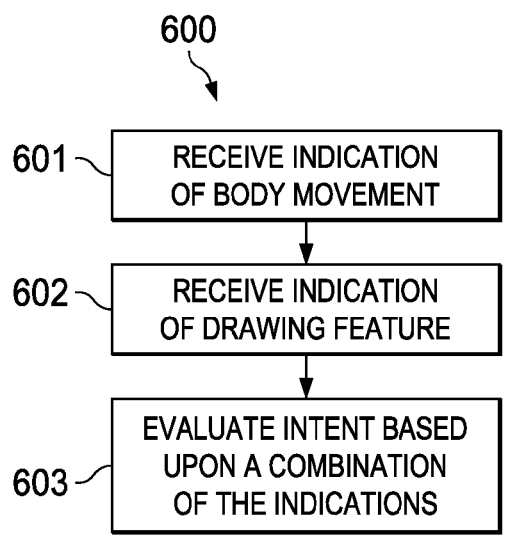
FIG. 6 is a flowchart of a method for providing a presentation interface according to some embodiments.

FIG. 6 is a flowchart of a method for providing a presentation interface. In some embodiments, methods 400 (gesture capture) and 500 (drawing capture) may be combined to create a presentation interface configured to accurately capture a user's intention, whether a presenter or an attendee, during a whiteboarding session or other type of virtual collaboration session. Particularly, at block 601, method 600 includes receiving, from a gesture capture system, an indication of a body movement performed by a participant of a virtual collaboration session. At block 602, method 600 includes receiving, from a drawing control system, an indication of a drawing characteristic associated with the participant of the virtual collaboration session. Then, at block 603, method 600 includes identifying an intent of the participant based upon a combination of the indications from the two distinct capture systems.

In some implementations, the techniques of FIG. 6 may employ a rules engine (e.g., within context engine(s) 206/215) to code the relative importance of the input criteria (weights) and perform a calculation to determine the intended action. For example, the indication of the body movement of block 601 may include a numerical quantification of the body movement, and the indication of the drawing characteristic of block 602 may include a numerical quantification of the drawing characteristic. In some cases, the numerical quantification may include a certainty that an action or movement has taken place. For example, block 601 may determine that a participant is facing the whiteboard with 80% certainty. Additionally or alternatively, block 601 may determine that 80% of the data points used to determine whether the user is facing the whiteboard indicate that the user is actually facing the whiteboard. Furthermore, method 600 may associate a selected weight (e.g., 0.9) that represents how important the user's facing direction is, relative to other user movements or actions, to the determination of that user's intent. Block 603 may then calculate a weighted average between the various numerical quantifications.

In some cases, method 600 may not be able to determine the user's intent with absolute certainty. For example, referring back to Table I, assume that method 600 determines that the user is facing the whiteboard and looking and his or her hand, but the user's wrist articulation cannot be determined to be either flexible or rigid with a minimum margin of confidence. Accordingly, the user's intent may be either classified as "draw" or "erase" with equal probability. In some cases, data obtained from drawing capture detection, such as data found in Table II, may help method 600 distinguish between the two intents. If, however, the drawing capture data is also inconclusive in some respect (or perhaps not used), then a multiple choice selection may be provided for the participant to not only choose the intended action, and also to provide guidance to the rules engine to disambiguate similar input(s) in the future.

For remote attendees of a whiteboarding session, further interactions to help aid interactions with in-room participants may be performed using the remote attendee's touch screen, as well as a web cam or 3D camera from a laptop or tablet device. Examples of gestures and actions for remote participants include, but are not limited to, "need to speak," "pointing," and "voting." Particularly, when a remote participant indicates heir need to speak during a virtual collaboration session, he or she may employ user-definable gestures such as detection of raising their hand, waving their hand, or cupping ears. The remote participant's device may then determine the remote participant needs a turn to speak or interact on the whiteboard, and may exchange messages or commands with interactive collaboration tool 101 to effect the participant's intent. In some cases, a pop-up window may appear on the whiteboard or each participant's device indicating to all the participant's need to speak.

In addition to using a touch screen, a camera capable of detecting gestures may detect a remote attendee pointing to areas of the digital whiteboard from their laptop or tablet device and the digital whiteboard showing all other participants what they are pointing to by an on-screen pointer or indicator. For example, a camera or touchscreen sensor on a participant's laptop or tablet may identify an area of the participant's device that the participant would like to emphasize or highlight—e.g., by pointing to it—and that action may cause a corresponding area on a shared digital whiteboard to be highlighted. Gesture detection devices configured to provide finer detection capabilities may further allow users pinching and tapping type gestures to also control elements on the digital whiteboard. Moreover, user defined gestures may also be used by remote attendees to indicate yes or no votes in digital collaboration sessions. For example using a thumbs up or down or other user-definable gesture may be used to detect a participant's approval or disapproval of an idea or topic discussed during the session.

Figure 7:
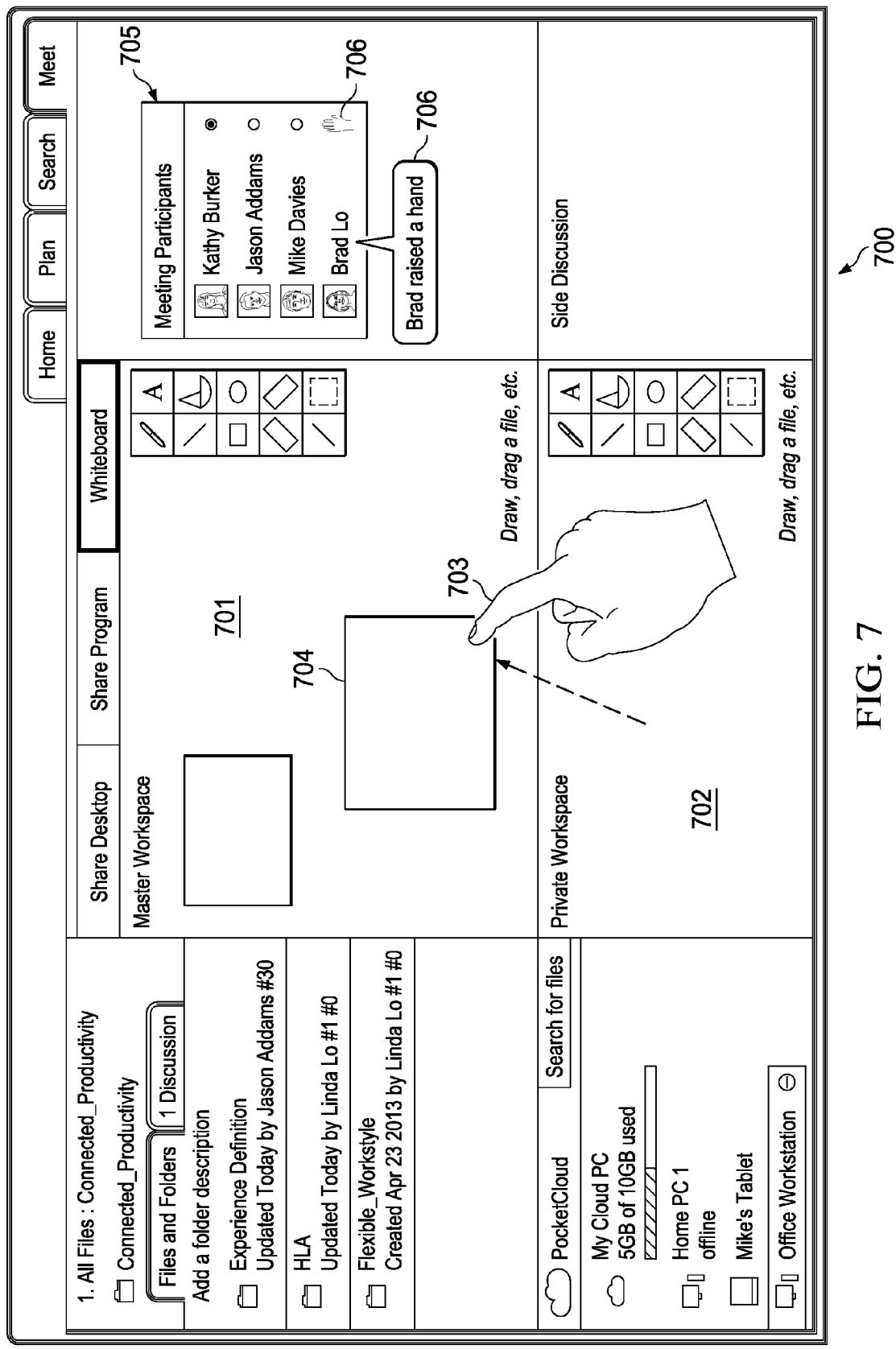
FIG. 7 is a screenshot illustrating a hand raising detection implementation according to some embodiments.

FIG. 7 is a screenshot illustrating a hand raising detection implementation according to some embodiments. In this embodiment, a representation of a virtual collaboration session is rendered on each participant's device 700. The session includes public portion 701, and private portion 702, such that participant 703 may draw or otherwise create material 704 in private portion 702 and drag and drop material 704 on public portion 701. As the session takes place, a list of participants 705 is also shown with the names or identifiers of each session participant.

Here, participant "Brad" has raised his hand, as detected by that participant's own device, and therefore indication 706 shows by text and/or icon that "Brad" has asked for a turn to speak during the session using a hand raising gesture. In some cases, indication(s) 706 may persist on participants' screens until a presenter or meeting organizer acknowledges it. Additionally or alternatively, indication(s) 706 may temporarily pop-up as a disappearing notification that fades out after a predetermined amount of time. Moreover, in some cases, once the need to speak is detected, the associated participant may be added to a queue of speakers so that he or she may have a turn to speak during the session.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory including program instructions stored thereon that, upon execution by the processor, cause the IHS to:
receive, from a gesture capture system, an indication of a body movement performed by a participant of a virtual collaboration session;
receive, from a drawing control system, an indication of a drawing characteristic associated with the participant of the virtual collaboration session; and
identify an intent of the participant based upon a combination of the indications, wherein the indication of the body movement includes a numerical quantification of the body movement, wherein the indication of the drawing characteristic includes a numerical quantification of the drawing characteristic, and wherein to identify the intent, the program instructions, upon execution by the processor, further cause the IHS to calculate a weighted average between the first and second numerical quantifications.

2. The IHS of claim 1, wherein the IHS includes a projector, and wherein the virtual collaboration session includes a whiteboarding or desktop sharing application.

3. The IHS of claim 1, wherein the gesture capture system includes a camera, a three-dimensional camera, or an infrared sensor.

4. The IHS of claim 1, wherein the body movement includes face orientation, gaze detection, or wrist articulation.

5. The IHS of claim 1, wherein the drawing control system includes an interactive whiteboard, a light curtain, a touch screen, or an infrared sensor.

6. The IHS of claim 1, wherein the drawing characteristic includes a size of a pointer, a distance between a pointer and a board, a pointer speed, or a repetitive motion.

7. The IHS of claim 1, wherein the intent includes intent to draw, intent to erase, or intent to point.

8. The IHS of claim 1, wherein the indication of the body movement includes two or more attributes selected from the group consisting of: face orientation, gaze detection, and wrist articulation; wherein the indication of the drawing characteristic includes two or more attributes selected from the group consisting of: a size of a pointer, a distance between a pointer and a board, a pointer speed, and a repetitive motion; and wherein to identify the intent, the program instructions, upon execution by the processor, further cause the IHS to combine the attributes.

9. The IHS of claim 1, wherein the indication of the body movement indicates at least one of: the participant is facing a whiteboard, the participant is looking at their hand, or the participant's wrist is flexible; wherein the indication of the drawing characteristic indicates at least one of: a pointer has a dimension smaller than a predetermined value, a distance between the pointer and a whiteboard is zero, a speed of the pointer is between two threshold values, or a same motion is being performed fewer than a predetermined number of times per unit time; and wherein the intent is identified as intent to draw.

10. The IHS of claim 1, wherein the indication of the body movement indicates at least one of: the participant is facing a whiteboard, the participant is looking at their hand, or the participant's wrist is rigid; wherein the indication of the drawing characteristic indicates at least one of: a pointer has a dimension greater than a predetermined value, a distance between the pointer and a whiteboard is zero, a speed of the pointer is greater than a threshold value, or a same motion is being performed more than a predetermined number of times per unit time, and wherein the intent is identified as intent to erase.

11. The IHS of claim 1, wherein the indication of the body movement indicates at least one of: the participant is facing an audience or camera, the participant is looking at the audience or camera, or the participant's wrist is rigid; wherein the indication of the drawing characteristic indicates at least one of: a pointer has a dimension smaller than a predetermined value, a distance between the pointer and a whiteboard is smaller than another predetermined value, a speed of the pointer is smaller than a threshold value, or a same motion is being performed fewer than a predetermined number of times per unit time, and wherein the intent is identified as intent to point.

12. The IHS of claim 1, wherein to identify the intent, the program instructions, upon execution by the processor, further cause the IHS to:
present at least two possible intentions to the participant; and
allow the participant to select one of the at least two possible intentions.

13. The IHS of claim 12, wherein the program instructions, upon execution by the processor, further cause the IHS to store the combination of the indications as corresponding to the selected one of the at least two possible intentions.

14. A method, comprising:
receiving, from a gesture capture system, an indication of a body movement performed by a participant of a virtual collaboration session;
receiving, from a drawing control system, an indication of a drawing characteristic associated with the participant of the virtual collaboration session; and
identifying an intent of the participant based upon a combination of the indications, wherein the indication of the body movement includes a numerical quantification of the body movement, wherein the indication of the drawing characteristic includes a numerical quantification of the drawing characteristic, and wherein identifying the intent further comprises calculating a weighted average between the first and second numerical quantifications.

15. The method of claim 14, wherein the gesture capture system includes a camera and wherein the virtual collaboration session includes a whiteboarding or desktop sharing application.

16. The method of claim 15, wherein the participant is located remotely with respect to at least one other participant of the virtual collaboration session, wherein the body movement includes the participant's hand raised above their head, wherein the intent is identified as the need to speak, and wherein to fulfill the intent, the method further comprises notifying the at least one other participant of the participant's need to speak.

17. The method of claim 15, wherein the body movement includes the participant's finger pointing to an area of a screen of the computing device, wherein the intent is identified as pointing, and wherein to fulfill the intent, the method further comprises highlighting an area of a whiteboard corresponding to the area of the screen.

18. The method of claim 15, wherein the body movement indicates the participant's approval or disapproval, wherein the intent is identified as voting, and wherein to fulfill the intent, the method further comprises capturing an indication of the participant's vote.

19. A memory storage device having program instructions stored thereon that, upon execution by an Information Handling System (IHS), cause the IHS to:
receive, from a gesture capture system, an indication of a body movement performed by a participant of a virtual collaboration session;
receive, from a drawing control system, an indication of a drawing characteristic associated with the participant of the virtual collaboration session; and
identify an intent of the participant based upon a combination of the indications, wherein the indication of the body movement includes a numerical quantification of the body movement, wherein the indication of the drawing characteristic includes a numerical quantification of the drawing characteristic, and wherein to identify the intent, the program instructions, upon execution by the IHS, further cause the IHS to calculate a weighted average between the first and second numerical quantifications.

20. The memory storage device of claim 19, wherein the body movement includes at least one of: a face orientation, a gaze, or a wrist articulation, wherein the drawing feature includes at least one of: a size of a pointer, a distance between a pointer and a board, a pointer speed, or a repetitive motion, and wherein the intent includes: an intent to draw, an intent to erase, or an intent to point.

* * * * *